United States Patent Office 3,585,192
Patented June 15, 1971

3,585,192
NEW ESTRANE DERIVATIVES
Arthur F. Marx and Hermanus J. Kooreman, Delft, Netherlands, assignors to Koninklijke Nederlandsche Gist-En Spiritusfabriek N.V., Delft, Providence of South Holland and Kingdom of the Netherlands
No Drawing. Filed Sept. 9, 1969, Ser. No. 856,483
Claims priority, application Great Britain, Sept. 11, 1969, 43,295/69
Int. Cl. C07c 173/00
U.S. Cl. 260—239.55                    11 Claims

ABSTRACT OF THE DISCLOSURE

New 14α,17α-alkylidenedioxy and 14α,17α-benzylidenedioxyestrane derivatives are disclosed which possess oestrogenic and hypocholesterolenic activities.

BACKGROUND OF THE INVENTION

This invention relates to new therapeutically useful steroids of the estrane series, to processes for their preparation and to pharmaceutical compositions containing them.

SUMMARY OF THE INVENTION

New 14α,17α-methylenedioxy-estrane derivatives have been discovered of the formula

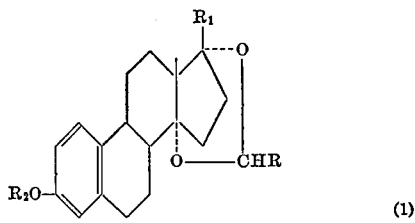

(1)

in which R represents an aliphatic hydrocarbon group having less than 6 carbon atoms or a phenyl group, $R_1$ represents an acetoxy group or a halogen atom and $R_2$ represents an alkyl group having less than 5 carbon atoms. In case $R_1$ represents an acetoxy group $R_2$ preferably is the tert. butyl group.

It has been found that estrane derivatives of Formula 1 are therapeutically useful compounds possessing oestrogenic and hypocholesterolemic activities.

DESCRIPTION OF PREFERRED EMBODIMENTS

The 14α,17α-methylenedioxy-estrane derivatives of Formula 1 may be prepared by methods known per se for the preparation of analogous compounds. By the term "methods known per se" is meant methods heretofore used or described in the chemical literature.

According to a feature of the invention the estrane derivatives of Formula 1, wherein $R_1$ represents an acetoxy group are prepared by reacting 3,14α,17α-trihydroxy-19-nor-1,3,5(10)-pregnatriene-20-one with an aldehyde of the formula RCHO, wherein R is as hereinbefore defined, followed by converting the thus obtained 14α,17α-methylenedioxy derivative of the formula

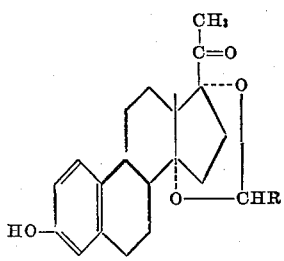

(2)

wherein R is as hereinbefore defined, to the corresponding 17β-acetoxy-estrane derivative in manner known per se.

Preferably the reaction of 3,14α,17α-trihydroxy-19-nor-1,3,5(10)-pregnatriene-20-one with an aldehyde of the formula RCHO is carried out at room temperature in the presence of a strong acid as catalyst and, if desired, in an inert organic medium. Preferred catalysts are perchloric acid, p-toluenesulphonic acid, sulphuric acid and hydrochloric acid. Suitable solvents are halogenated alkanes, methyl acetate, ethyl acetate, dioxane, tetrahydrofuran, benzene and dimethylformamide.

The conversion of a 14α,17α-methylenedioxy derivative of Formula 2 to the corresponding 17β-acetoxy-estrane derivative of Formula 1, wherein R and $R_2$ are as hereinbefore defined and $R_1$ represents an acetoxy group, is preferably carried out in four succeeding reaction steps.

(a) Protection of the 3-hydroxyl group by etherification; for example, a compound of Formula 2 may be reacted with isobutylene, thereby obtaining the corresponding 3-tert. butyloxy derivative. The reaction is preferably carried out in an inert organic medium, such as methylene chloride and in the presence of a small amount of a strong acid, such as hydrochloric acid.

(b) A compound of Formula 2, wherein the 3-hydroxyl group has thus been protected, is then converted with hydroxylamine to the corresponding 20-oximino derivative of the formula

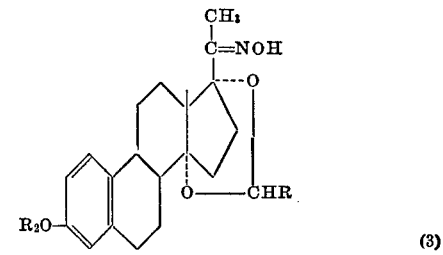

(3)

wherein R and $R_2$ are as hereinbefore defined. The reaction is preferably carried out in aqueous alkali hydroxide solution.

(c) A 20-oximino compound of Formula 3, is then subjected to a Beckmann rearrangement, for example with phosphorus oxychloride in pyridine at a temperature somewhat below room temperature, for instance, 5–10° C. A 17β-acetylamino-estrane derivative of the formula

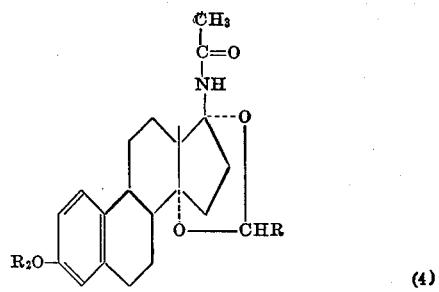

(4)

wherein R and $R_2$ are as hereinbefore defined is thereby obtained.

(d) A 17β-acetylamino-estraine derivative of Formula 4, is converted with a nitrosating agent, for example nitrosyl chloride, to the corresponding 17β-acetoxy-estrans derivative of Formula 1, wherein R and $R_2$ are as hereinbefore defined and $R_1$ represents an acetoxy group. The reaction is preferably carried out in acetic acid and/or acetic anhydride at a temperature somewhat below room temperature, for instance 5° C.

All the compounds of Formulas 2, 3, and 4 wherein R and $R_2$ are as hereinbefore defined, are new compounds particularly useful in a preferred procedure for obtained compounds of Formula 1 and as such form a feature of the invention.

The starting material in the procedure described above, 14α,17α - trihydroxy - 19 - nor - 1,3,5(10) - regnatriene-20-one, is also a new compound. It can be prepared in a sequence of five reaction steps, using the known compound 14α,17α-dihydroxyprogesterone as starting material.

(a) First, 14α,17α-dihydroxyprogesterone may be microbiologically hydroxylated in the 11-position, for example with *Cunninghamella blakesleeana, Curvularia lunata,* or with *Aspergillus ochraceus,* thus obtaining 11,14α,17α-trihydroxyprogesterone.

(b) This compound is then dehydrated to give the corresponding 9(11)-dehydro derivative; for example, 11α,14α,17α-trihydroxyprogesterone may be acylated, for example with methane sulphonyl chloride to 11α,14α,17α-trihydroxyprogesterone 11-methane sulphonate. The acyl derivative, dissolved in a suitable organic solvent, such as dimethylformamide, can then be heated with lithium chloride to give 14α,17α-dihydroxy-9(11)-dehydroprogesterone. The 11β-isomer, 11β,14α,17α-trihydroxyprogesterone is converted with N-bromo-acetamide to the corresponding 9(11)-dehydro derivative. Preferably, this reaction is carried out at room temperature, in a suitable organic medium, such as pyridine.

(c) This compound may be dehydrogenated in the 1,2-position, for example with selenium oxide or 2,3-dichloro-4,5-dicyanobenzoquinone, or by fermentation with a suitable microorganism, such as *Corynebacterium simplex,* to give 14α,17α-dihydroxy-1,9(11)-bisdehydroprogesterone, which can also be indicated as 14α,17α-dihydroxy-1,4,9(11)-pregnatriene-3,20-dione.

(d) The compound thus obtained is then subjected to an aromatization reaction; this can be carried out, for example, by heating the compound in pyridine with zinc dust to give 3,14α,17α-trihydroxy-19-nor-1,3,5(10)-pregnatetraene-20-one.

(e) The 9(11)-double bond is then reduced again, for example catalytically, using platinum oxide as catalyst. There is obtained a mixture of the 9α- and the 9β-isomer, 3, 14α,17α-trihydroxy-19-nor-1,3,5(10)-pregnatriene - 20-one and 3,14α,17α-trihydroxy-19-nor-9β-1,3,5(10)-pregnatriene-20-one respectively, the hydrogen atom in the 9α-position not being indicated as is conventional, which isomers can be separated by crystallization or column chromatography.

Each of these isomers is then reacted further with an aldehyde of the formula RCHO, as is described above, to give respectively the 9α- or the 9β-isomer of a 17β-acetoxy estrane derivative of Formula 1, wherein R and R² are as hereinbefore defined and R₁ represents an acetoxy group.

All the compounds obtained according to the above described processes, except 11β,14α,17α-trihydroxyprogesterone, are new.

According to a modification of the procedure described above the 14α,17α-methylenedioxy derivatives of Formula 2, which are intermediates in the process of preparing the compounds of Formula 1, wherein R₁ represents anacetoxy group, are prepared by first converting 14α,17α-dihydroxyprogesterone to a 14α,17α-methylenedioxy derivative of the formula

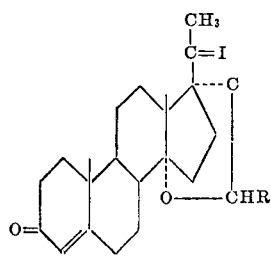

(5)

wherein R is as hereinbefore defined, and then converting a compound thus obtained to a 3-hydroxy-19-nor-1,3,5-(10)-pregnatriene derivative of Formula 2.

The various processes used to carry out this modified procedure are quite similar to those described hereinbefore. However, upon reduction of the 9(11)-double bond a mixture of the 9α- and the 9β-isomer is not obtained, as is the case in the first described procedure, only one of the two possible isomers is formed, the nature of the isomer depending on the way in which the reduction is carried out. When the reduction is carried out catalytically, for instance with platinum oxide as catalyst, the 9β-isomer of a compound of Formula 2 is obtained exclusively, whereas when the reduction of the 9(11)-double bond is carried out with lithium in liquid ammonia only the 9α-isomer is formed.

The compounds of Formula 5 are disclosed in our copending U.S. patent application Ser. No. 712,600, which application is incorporated herein by reference.

According to another feature of the invention, the estrans derivatives of Formula 1, wherein R₁ represents a halogen atom and R and R₂ are as hereinbefore defined, are prepared by reacting a 3-alkoxy-14α,17α-dihydroxy-1,3,5(10)-estratriene-17β-carboxylic acid of the formula

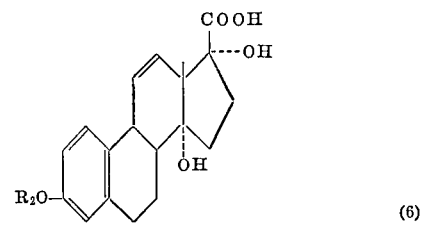

(6)

wherein R₂ is as herebefore defined, with an aldehyde of the formula RCHO, wherein R is as hereinbefore defined; the thus obtained 14α,17α-methylenedioxy derivative of the formula

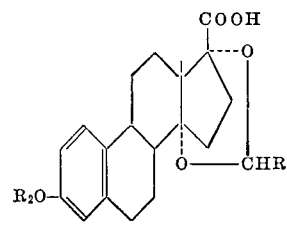

is then converted to the corresponding 17β-halo derivative in manner known per se.

The reaction of a 3-alkoxy-14α,17α-dihydroxy-1,3,5 (10)-estratriene-17β-carboxylic acid of Formula 6 with an aldehyde of the formula RCHO can be carried out in the same manner as described above for the corresponding reaction with 3,14α,17α-trihydroxy-19-nor-1,3,5(10)-pregnatriene-20-one.

A compound of Formula 7 is converted to the corresponding 17β-halo derivative by means of a modified Hunsdiecker reaction (J. Org. Chem. 1961, 26, 280). The reaction is carried out in the presence of lead tetraacetate and a suitable organic solvent medium, such as benzene or carbon tetrachloride. Chlorine can be provided by, for example, lithium chloride; iodine is preferably added as such to the reaction mixture. In the preparation of the 17β-iodoestrane derivatives the reaction mixture is preferably illuminated with a tungsten lamp.

The compounds of Formula 6, which are used as starting material in the above preferred procedure, are new compounds. A 3-alkoxy-14α,17α-dihydroxy-1,3,5(10)- estratiene-17β-carboxylic acid of Formula 6 may be prepared from the known compound 14α-hydroxyhydrocartisone 21-acetate in a manner known per se.

First, a 9(11)-double bond is introduced in 14α-hydroxyhydrocortisone 21-acetate by reaction with N-bromoacetamide in pyridine; then a 1,2-double bond is introduced microbiologically, for example with *Corynebacterium Simplex*, to give 14α,17α,21-trihydroxy-1,4,9(11)-pregnatriene-3,20-dione 21-acetate. The compound thus obtained is subjected to an aromatization reaction, for example with zinc dust in pyridine by heating under reflux.

There is obtained 3,14α-17α-21-tetrahydroxy-19-nor-1,3,5(10),9(11)-pregnatetraene-20-one 21-acetate which is converted, after alcoholysis of the acetyl group with for example sodium methanolate in methanol, with trimethyl orthoacetate to 3,14α,17α-21-tetrahydroxy-19-nor-1,3,5(10),9(11)-pregnatetraene-20-one 17,21-methylorthoacetate. This reaction is preferably carried out at room temperature and under reduced pressure in a suitable organic solvent, such as dioxane, in the presence of a strong acid, such as p-toluenesulphonic acid. After having protected the 17- and 21-hydroxyl groups in this manner, the 3-hydroxyl group is converted to a 3-alkoxy-group, for example with dialkyl sulphate, preferably in a medium consisting of an inert organic solvent, such as chloroform, and an aqueous alkali hydroxide solution; the reaction can be carried out at room temperature. The 17,21-methyl-orthoacetate group is then hydrolyzed again, for example by means of a strong acid, such as hydrochloric acid and is then converted to a 17,21-dihydroxy group.

The 3-alkoxy-14α,17α,21-trihydroxy-19-nor-1,3,5(10),9(11)-pregnatetraene-20-one thus obtained is oxidized to the corresponding 17β-carboxylic acid. A suitable oxidation agent is for example periodic acid ($H_5IO_6$) and sodium bismuthate; the reaction can be carried out at room temperature in a suitable organic solvent medium, such as tetrahydrofuran. A 3-alkoxy-14α,17α-dihydroxy-1,3,5(10),9(11)-estratetraene-17β-carboxylic acid is obtained which is reduced, for example catalytically, using platinum oxide as catalyst, to a 3-alkoxy-14α,17α-dihydroxy-1,3,5(10)-estratriene-17β-carboxylic acid of Formula 6. A compound of this formula can then be used in the procedure described above to prepare a compound of Formula 1, wherein $R_1$ represents a halogen atom.

All the compounds described in the above preferred procedure are new compounds particularly useful in the preparation of compounds of Formula 1.

EXAMPLE I (a) 5.5 l. of nutrient medium consisting of 0.5% of glucose and 0.5% of corn steep liquor were inoculated with 275 ml. of shake culture of *Aspergillus ochraceus*. The microorganism was grown at 26° C. with vigorous stirring and aeration. After 24 hours a solution of 1.4 g. of 14α,17α-dihydroxy-progesterone in 20 ml. of dimethylformamide was added. After 72 hours, the conversion being complete, the culture broth was filtered and the filtrate extracted three times with 1 l. of methyl isobutyl ketone. The extract was concentrated under reduced pressure and the residue crystallized from methanol; yield: 0.4 g. of 11α,14α,17α-trihydroxyprogesterone.

Melting point: 232–234.5° C.
I.R. (in $CHCl_3$): $\nu_{max}$=3608, 3485, 1711, 1665, 1612, and 1350 cm.$^{-1}$.

(b) To a stirred suspension of 5 g. of 11α,14α,17α-trihydroxyprogesterone in 50 ml. of pyridine, 1.2 ml. of methane sulphonylchloride was added dropwise. The reaction mixture was kept at room temperature for 90 minutes and then poured into 750 ml. of water, thereby obtaining 5.6 g. of 11α,14α,17α-trihydroxyprogesterone 11-methane sulphonate.

Melting point: 160–161° C.
I.R. (in $CHCl_3$): $\nu_{max}$=3600, 3505, 1709, 1665, 1610, 1350, 1333, 1170, 921 and 900 cm.$^{-1}$.

(c) A solution of 5.5 g. of 11α,14α,17α-trihydroxyprogesterone 11-methane sulphonate and 5.5 g. of lithium chloride in 55 ml. of dimethylformamide was kept at 100° C. for 30 minutes. To the cooled reaction mixture 20 ml. of water were added, yielding 3.5 g. of 14α,17α-dihydroxy-9(11)-dehydroprogesterone.

Melting point: 235–241° C.
N.M.R. (in $CDCl_3$+some DMSO-$d_6$): δ=0.58, 1.34, 2.15, about 4.0, 5.58 and 5.68 p.p.m.
Molecular ion peak in mass spectrum:
Calculated for $C_{21}H_{28}O_4$: 344. Found: 344.

(d) A mixture of 10 g. of 14α,17α-dihydroxy-9(11)-dehydroprogesterone, 6.6 g. of selenium oxide, 2 ml. of pyridine and 500 ml. of tert. butanol was refluxed for 17 hours. The precipitated selenium was filtered off, the filtrate diluted with 2.5 l. of methyl isobutyl ketone and washed with N sodium hydroxide solution, 0.5 N sulfuric acid and water. The organic fraction was concentrated and the brown, crystalline residue triturated with 50 ml. of methanol yielding 2.0 g. of nearly white 14α,17α-dihydroxy-1,9(11)-bisdehydroprogesterone.

Melting point: 268–272° C.
I.R. (in $CHCl_3$): $\nu_{max}$=3605, 3560, 3475, 1710, 1662, 1622, 1603 and 1350 cm.$^{-1}$.

(e) A mixture of 1.0 g. of 14α,17α-dihydroxy-1,9(11)-bisdehydroprogesterone, 30 ml. of pyridine containing 0.5 ml. of water, and 20 g. of zinc dust was heated under reflux with stirring for 210 min. After cooling, the zinc was removed by filtration and washed with methyl isobutyl ketone. The filtrate was concentrated and the residue dissolved in 25 ml. of methyl isobutyl ketone and this solution was washed with N sulfuric acid and water. The solvent was evaporated in vacuo and the residue was crystallized from methanol; yield: 0.50 g. of 3,14α,17α-trihydroxy - 19 - nor-1,3,5(10),9(11)-pregnatetraene-20-one.

Melting point: 230–235° C.
N.M.R. (in a mixture of $CDCl_3$ and DMSO-$d_6$): δ=0.68, 2.23, 6.23 (broad), 6.55, 6.6 and 7.5 (AB spectrum) p.p.m.

(f) A solution of 0.40 g. of 3,14α,17α-trihydroxy-19-nor-1,3,5(10),9(11)-pregnatetraene-20-one in 15 ml. of a mixture (1:1) of methanol and methylene chloride was shaken with 10 mg. of platinum oxide for 3 hours in a hydrogen atmosphere. After removal of the catalyst by filtration and concentration of the filtrate there was obtained a residue which was purified by column chromatography (silica gel, eluent: a solution of 5% acetone in benzene): yield: 120 mg. of an a-polar and 160 mg. of a polar compound. The a-polar compound proved to be 3,14α,17α-trihydroxy-19-nor-9β-1,3,5(10) - pregnatriene-20-one.

Melting point: 167–169° C.
N.M.R. (in a mixture of $CDCl_3$ and DMSO-$d_6$): δ=0.83, 2.21, 6.67, 6.7 and 7.2 (AB-spectrum) p.p.m.

The polar compound proved to be 3,14α,17α-trihydroxy-19-nor-1,3,5(10)-pregnatriene-20-one (i.e. the 9α-isomer).

Melting point: 244–248° C.
N.M.R. (in a mixture of $CDCl_3$ and DMSO-$d_6$): δ=0.72, 2.23, 6.53, 6.6 and 7.1 (AB-spectrum) p.p.m.

(g) A solution of 1.0 g. of 3,14α,17α-trihydroxy-19-nor-1,3,5(10)-pregnatriene-20-one in a mixture of 6 ml. of paraldehyde, 6 ml. of dioxane and 0.05 ml. of 70% perchloric acid was kept at room temperature for 15 minutes. On successive addition of 1.5 ml. of N sodium hydrogen carbonate and 30 ml. of water, 1.0 g. of 3-hydroxy-14α,17α-ethylidenedioxy - 19 - nor-1,3,5(10)-pregnatriene-20-one was precipitated.

Melting point: 200–201° C.
I.R. (in $CHCl_3$): $\nu_{max}$=3605, 1708, 1608, 1580, 1492, 1398, 1349, 1130 and 1107 cm.$^{-1}$.

(h) A magnetically stirred suspension of 8.5 g. of 3-hydroxy-14α,17α-ethylidenedioxy - 19 - nor-1,3,5(10)- pregnatriene-20-one and 100 ml. of methylene chloride in a high pressure reaction vessel was cooled to −20 to −30° C. Isobutylene, dried over calcium chloride, was passed in until the volume of the reaction mixture was about 200 ml. Then 0.8 ml. of concentrated sulphuric acid was added, the reaction vessel closed and the contents stirred at room temperature for 72 hours. The reaction mixture was washed with aqueous sodium hydrogen carbonate solution and water and then concentrated to dryness. The residue was crystallized from methanol; yield: 6.9 g. of 3-tert. butyloxy-14α,17α-ethylidenedioxy-19-nor-1,3,5(10)-pregnatriene-20-one.

Melting point: 132–141° C.
I.R. (in $CHCl_3$): $\nu_{max.}$=1709, 1603, 1570, 1490, 1408, 1359, 1165, 1135 and 1112 cm.$^{-1}$.

(i) To a solution of 2.0 g. of hydroxylamine hydrochloride in 16 ml. of a 5% aqueous sodium hydroxide solution was added 0.8 g. of 3-tert.butyloxy-14α,17α-ethylidenedioxy - 19 - nor-1,3,5(10)-pregnatriene-20-one. Then, ethanol was added (48 ml.) until a clear solution was obtained. The mixture was refluxed for 10 minutes, diluated with water and cooled; the precipitate yielded 0.6 g. of 3 tert.butyloxy-20-oximino-14α,17α-ethylidenedioxy-19-nor-1,3,5(10)-pregnatriene.

Melting point: 180–184° C.
I.R. (in $CHCl_3$): $\nu_{max}$=3490, 1600, 1489, 1406, 1365, 1150, 1135 and 1110 cm.$^{-1}$.

(j) A solution of 10 g. of 3-tert.butyloxy-20-oximino-14α,17α - ethylidenedioxy-19-nor-1,3,5(10)-pregnatriene in 40 ml. of pyridine was treated slowly, while stirred at 5–10° C., with a solution of 20 ml. of phosphorus oxychloride in 60 ml. of pyridine and then stirring was continued for three hours at room temperature. The mixture was poured into ice water, neutralized with 4 N hydrochloric acid, and extracted with chloroform. The extract was washed with water and dried on magnesium sulphate. Evaporation of the solvent gave an oil, which was chromatographed on alumina (eluent benzene/ethyl acetate). The oil thus obtained was crystallized from benzene; yield: 6.5 g. of 3-tert.butyloxy-14α,17α-ethylidenedioxy-17β-acetylamino-1,3,5(10)-estratriene.

Melting point: 126–128° C.
I.R. (in $CHCl_3$): $\nu_{max}$=3438, 1691, 1603, 1490, 1406 and 1110 cm.$^{-1}$.

(k) A solution of 5.5 g. of 3-tert.butyloxy-14α,17α-ethylidenedioxy - 17β - acetylamino-1,3,5(10)-estratriene in 180 ml. of acetic acid, 60 ml. of acetic anhydride and 27 ml. of pyridine was treated with 16 g. of anhydrous potassium acetate. The mixture was cooled to 5° C. and then 50 ml. of nitrosyl chloride in acetic anhydride were added dropwise. Stirring was continued for 45 minutes at a temperature between 4° and 6° C. The reaction mixture was poured into ice water and adjusted with an aqueous 4 N sodium hydroxide solution to pH=5 and then extracted with chloroform. The chloroform layer was washed with an aqueous sodium bicarbonate solution and with water until it was neutralized. The extract was dried on sodium sulphate and the solvent evaporated; the residue was chromatographed on alumina (eluent benzene/acetone). Yield: 1.1 g. of 3-tert.butyloxy-14α,17α-ethylidenedioxy-17β-acetoxy-1,3,5(10)-estratriene.

Melting point: 132–135° C.
$\lambda_{max}$ (in methanol)=271 and 278 nm.; $E_{1 cm.}^{1\%}$=17 and 19

I.R. (in $CHCl_3$): $\nu_{max}$=1748, 1602, 1560, 1490, 1405, 1382, 1368, 1135 and 1110 cm.$^{-1}$.
N.M.R. (in $CDCl_3$): δ=1.00, 1.33, 1.37 (doublet), 2.07, 5.30 (quadruplet), 6.7, 6.8 and 7.2 (AB-spectrum) p.p.m.
Molecular ion peak in mass spectrum:
Calculated for $C_{26}H_{36}O_5$: 428. Found: 428.

EXAMPLE II (a) According to the procedure described in Example Ig, 3,14α,17α-trihydroxy-19-nor-1,3,5(10) - pregnatriene-20-one (prepared according to the procedure described in Example If) was converted with hexanal to 3-hydroxy-14α,17α - hexylidenedioxy-19-nor-1,3,5(10)-pregnatriene-20-one, isolated as an oil.

I.R. (in $CHCl_3$): $\nu_{max}$=3605, 1710, 1610, 1583, 1350 and 1109 cm.$^{-1}$.
Molecular ion peak in mass spectrum:
Calculated for $C_{26}H_{36}O_4$: 412. Found: 412.

(b) According to the procedure described in Example Ih, 3-hydroxy-14α,17α-hexylidenedioxy-19-nor-1,3,5(10)-pregnatriene-20-one was converted to 3-tert.butyloxy-14α, 17α hexylidenedioxy-19-nor-1,3,5(10)-pregnatriene-20-one, isolated as an oil.

I.R. (in $CHCl_3$): $\nu_{max}$=1710, 1606, 1568, 1492, 1385, 1362, 1350, 1148 and 1110 cm.$^{-1}$.
Molecular ion peak in mass spectrum:
Calculated for $C_{30}H_{44}O_4$: 468. Found: 468.

(c) According to the procedure described in Example Ii, 3 - tert.butyloxy-14α,17α-hexylidenedioxy-19-nor-1,3, 5(10)-pregnatriene-20-one was converted to 3-tert.butyloxy - 20 - oximino-14α,17α-hexylidenedioxy-19-nor-1,3, 5(10)-pregnatriene, isolated as and oil.

I.R. (in $CHCl_3$): $\nu_{max}$=3595, 1650, 1603, 1565, 1490, 1383, 1360 and 1109 cm.$^{-1}$ .
Molecular ion peak in mass spectrum:
Calculated for $C_{30}H_{45}O_4N$: 483. Found: 483.

(d) According to the procedure described in Example Ij, 3 - tert.butyloxy-20-oximino-14α,17α-hexylidenedioxy-19 - nor - 1,3,5(10)-pregnatriene was converted to 3-tert. butyloxy - 14α,17α-hexylidenedioxy-17β-acetylamino-1,3, 5(10)-estratriene, isolated as an oil .

I.R. (in $CHCl_3$): $\nu_{max}$=3440, 1690, 1670 (shoulder), 1602, 1490, 1380, 1359, 1105, 986 and 891 cm.$^{-1}$.
Molecular ion peak in mass spectrum:
Calculated for $C_{30}H_{45}O_4N$: 483. Found: 483.

(e) According to the porcedure described in Example Ik, 3 - tert.butyloxy-14α,17α-hexylidenedioxy-17β-acetylamino-1,3,5(10)-estratriene was converted to 3-tert.butyloxy - 14α,17α - hexylidenedioxy-17β-acetoxy-1,3,5(10)-estratriene, isolated as an oil.

$\lambda_{max}$ (in methanol)=270 and 278 nm.; $E_{1 cm.}^{1\%}$=19 and 17

I.R. (in $CHCl_3$): $\nu_{max}$=1750, 1604, 1565, 1490, 1380, 1361, 1300, 1165, 1148, 1102, 1053, 1000, 958, 940 and 895 cm.$^{-1}$.
N.M.R. (in $CDCl_3$): δ=0.88 (triplet), 1.00, 1.34, 2.09, 5.10 (triplet), 6.70 and 6.75–7.20 (AB-spectrum) p.p.m.
Molecular ion peak in mass spectrum:
Calculated for $C_{30}H_{44}O_5$: 484. Found: 484.

EXAMPLE III (a) According to the procedure described in Example Ig, 3,14α,17α-trihydroxy - 19 - nor-1,3,5(10)-pregnatriene-20-one (prepared according to the procedure of Example If) was converted with benzaldehyde to 3-hydroxy-14α,17α-benzylidenedioxy - 19 - nor - 1,3,5(10)-pregnatriene-20-one.

Melting point: 184–186° C.
I.R. (in $CHCl_3$): $\nu_{max}$=3608, 1714, 1610, 1585, 1497, 1353 and 1090 cm.$^{-1}$.

(b) According to the procedure described in Example Ih, 3 - hydroxy - 14α,17α - benzylidenedioxy - 19 - nor-1,3,5(10)-pregnatriene - 20 - one was converted to 3-tert.butyloxy-14α,17α-benzylidenedioxy - 19 - nor - 1,3, 5(10)-pregnatriene-20-one.

Melting point: 139.5–140.5° C.
I.R. (in CHCl$_3$): $\nu_{max}$=1712, 1608, 1570, 1495, 1364, 1355, 1150 and 1090 cm.$^{-1}$.

(c) According to the procedure described in Example Ii, 3-tert.butyloxy - 14α,17α - benzylidenedioxy - 19 - nor-1,3,5(10) - pregnatriene - 20 - one was converted to 3-tert.butyloxy - 20 - oximino-14α,17α-benzylidenedioxy-19-nor-1,3,5(10)-pregnatriene.

Melting point: 212–213° C.
I.R. (in CHCl$_3$): $\nu_{max}$=3598, 1642, 1605, 1565 and 1493 cm.$^{-1}$.

(d) According to the procedure described in Example Ij, 3-tert.butyloxy - 20 - oximino - 14α,17α - benzylidenedioxy - 19 - nor - 1,3,5(10)pregnatriene was converted to 3 - tert.butyloxy - 14α,17α - benzylidenedioxy-17β-acetylamino-1,3,5(10)-estratriene.

Melting point: 177–179° C.
I.R. (in CHCl$_3$): $\nu_{max}$=3440, 1700, 1692, 1605, 1492, 1386, 1362 and 1090 cm.$^{-1}$.

(e) According to the procedure described in Example Ik, 3 - tert.butyloxy - 14α,17α - benzylidenedioxy-17β-acetylamino - 1,3,5(10) - estratriene was converted to 3-tert.butyloxy - 14α,17α - benzylidenedioxy-17β-acetoxy-1,3,5(10)-estratriene, isolated as an oil.

$\lambda_{max}$ (in methanol)=221 (shoulder), 282 and 278 nm.
$E^{1\%}_{1cm}$=190, 19 and 19
I.R. (in CHCl$_3$): $\nu_{max}$=1750, 1603, 1583, 1490, 1382, 1361, 1300, 1161, 1149, 1128, 1060, 1050, 1023, 997, 939 and 895 cm.$^{-1}$.
N.M.R. (in CDCl$_3$): δ=1.06, 1.32, 2.06, 6.11, 6.73, 6.8 and 7.25 (AB-spectrum) and 7.3–7.7 (multiplet) p.p.m.
Molecular ion peak in mass spectrum:
Calculated for C$_{31}$H$_{38}$O$_5$: 490. Found: 490.

EXAMPLE IV (a) A mixture of 5.0 g. of 14α-hydroxyhydrocortisone 21-acetate, 3.0 g. of N-bromo-acetamide and 50 ml. of pyridine was stirred for 15 minutes in a nitrogen atmosphere. Then the reaction mixture was cooled to 10° C.; sulphur dioxide gas was passed through the solvent until the mixture gave a negative reaction on acidified potassium iodide/starch paper. On addition of 200 ml. of water the steroid precipitated; yield: 4.4 g. of 14α,17α,21-trihydroxy-4,9(11)-pregnadiene-3,20-dione 21-acetate.

Melting point: 187–190° C.
I.R. (in CHCl$_3$): $\nu_{max}$=3605, 3555, 3405, 1743, 1729, 1665, 1612 and 1373 cm.$^{-1}$.

(b) 10 l. of nutrient medium consisting of 1% yeast extract and 0.5% peptone of pH 6.8 were inoculated with 500 ml. of shake culture of *Corynebacterium simplex*. The micro-organism was grown at 28° C. with vigorous stirring and strong aeration. After 12 hrs. 2 g. of ball-milled 14α,17α,21 - trihydroxy - 4,9(11) - pregnadiene-3,20-dione 21-acetate were added. After 24 hours, the conversion being complete, the fermentation fluid was three times extracted with 10 l. of methyl isobutyl ketone; the extract was concentrated and the residue crystallized from methanol. Yield: 0.5 g. of 14α,17α,21-trihydroxy-1,4,9(11)-pregnatriene-3,20-dione 21-acetate.

Melting point: 196–199° C.
I.R. (in CHCl$_3$): $\nu_{max}$=3605, 3560, 3460, 1745, 1730, 1665, 1625, 1608 and 1372 cm.$^{-1}$.

(c) A mixture of 1.0 g. of 14α,17α,21-trihydroxy-1,4,9(11)-pregnatriene-3,20-dione 21-acetate, 30 ml. of pyridine containing 0.5 ml. of water, and 20 g. of zinc dust was heated under reflux with stirring for 210 minutes. After cooling, the zinc was removed by filtration and washed with methyl isobutyl ketone. The filtrate was concentrated and the residue dissolved in 25 ml. of methyl isobutyl ketone and this solution was washed with N sulphuric acid and water. The solvent was evaporated in vacuo; the residue was crystallized from methanol. Yield: 0.50 g. of 3,14α,17α,21-tetrahydroxy - 19 - nor-1,3,5(10),9(11)-pregnatetraene-20-one 21-acetate.

Melting point: 212–213° C.
N.M.R. (in a mixture of CDCl$_3$ and DMSO-d$_6$): δ=0.71, 2.15, 5.00, 6.25 (multiplet), 6.56, 6.65 and 7.55 (AB-spectrum) p.p.m.

(d) A mixture of 10 g. of 3,14α,17α,21-tetrahydroxy-19 - nor - 1,3,5(10),9(11) - pregnatetraene-20-one 21-acetate, 100 ml. of methanol and 100 ml. of methylene chloride was treated with 25 ml. of N sodium methanolate in methanol and stirred for 30 minutes in a nitrogen atmosphere at room temperature. After acidification with acetic acid, the reaction mixture was concentrated and the residue dissolved in a mixture of water and methyl isobutyl ketone. The organic fraction was separated and washed with water. On evaporation of the solvent in vacuo an oily residue was obtained which crystallized from methanol/water. Yield: 7.0 g. of 3,14α,17α,21-tetrahydroxy - 19 - nor - 1,3,5(10),9(11) - pregnatetraene-20-one.

Melting point: 201–205° C.
I.R. (in KBr): $\nu_{max}$=3560, 3380, 3270, 3055, 3021, 1728, 1721, 1628, 1610, 1570 and 1492 cm.$^{-1}$.

(e) In a reaction vessel suitable for vacuum distillation a mixture of 10 g. of 3,14α,17α21-tetrahydroxy-19-nor-1,3,5(10),9(11) - pregnatetraene - 20 - one, 50 ml. of dioxane and 50 ml. of trimethyl orthoacetate was kept at room temperature and treated with five 70 mg. portions of p-toluene sulphonic acid over a period of 45 minutes, the pressure in the apparatus being maintained at about 30 mm. Hg. The reaction mixture was neutralized with pyridine and poured into 800 ml. of water. The precipitate yielded 10.6 g. of 3,14α,17α,21-tetrahydroxy - 19 - nor - 1,3,5(10),9(11) - pregnatetraene-20-one 17,21-methylorthoacetate.

Melting point: 171–176° C.
I.R. (in CHCl$_3$): $\nu_{max}$=3598, 3535, 1725, 1625, 1603, 1572, 1489 and 1389 cm.$^{-1}$.

(f) A mixture of 5 g. of 3,14α,17α,21-tetrahydroxy-19-nor-1,3,5(10),9(11)-pregnatetraene-20-one 17,21-methylorthoacetate, 100 ml. of chloroform, 100 ml. of an aqueous potassium hydroxide solution and 20 ml. of dimethyl sulphate was stirred for 45 minutes at room temperature. The chloroform layer was separated, washed three times with water and evaporated to dryness. After crystallization from methanol there was obtained 4.2 g. of 3-methoxy-14α,17α,21-trihydroxy-19 - nor - 1,3,5(10),9(11)-pregnatetraene-20-one 17,21 methylorthoacetate.

Melting point: 157–161° C.
N.M.R. (in CDCl$_3$):δ=0.73, 1.58, 3.30, 3.78, 4.10 and 4.25 (AB-spectrum), 6.32(broad), 6.63, 6.7 and 7.6 (AB-spectrum) p.p.m.

(g) A mixture of 7.0 g. of 3-methoxy-14α,17α,21-trihydroxy-19-nor-1,3,5(10),9(11)-pregnatetraene - 20 - one 17,21-methylorthoacetate, 60 ml. of dimethylformamide and 35 ml. of water, adjusted at pH 3 with N hydrochloric acid, was stirred at room temperature for 150 minutes. The pH of the reaction mixture was then changed to 7 by addition of a saturated sodium hydrogen carbonate solution. Stirring was continued for another 18 hours at room temperature; the mixture was then diluted with 75 ml. of water. The precipitate yielded 6.3 g. of 3-methoxy-14α,17α,21-trihydroxy - 19 - nor-1,3,5(10),9(11)-pregnatetraene-20-one-21-acetate.

Melting point: 209–213° C.
I.R. (in CHCl$_3$):$\nu_{max}$=3605, 3555, 3465, 1743, 1730, 1619, 1605, 1568, 1492 and 1040 cm.$^{-1}$.

(h) According to the procedure described above in (d), 3 - methoxy - 14α,17α,21 - trihydroxy - 19 - nor-1,3,5(10), 9(11)-pregnatetraene-20-one 21-acetate was converted to 3-methoxy-14α,17α,21-trihydroxy - 19 - nor - 1,3,5(10), 9(11)-pregnatetraene-20-one.

Melting point: 167–171° C.
I.R. (in $CHCl_3$): $\nu_{max}$=3610, 3555, 3485, 1712, 1620, 1606, 1568 and 1493 cm.$^{-1}$.

(i) To a solution of 1.8 g. of 3-methoxy-14α,17α,21-trihydroxy - 19 - nor-1,3,5(10),9(11)-pregnatetraene-20-one in a mixture of 50 ml. of tetrahydrofuran and 7 ml. of water, a solution of 1.25 g. of crystallized periodic acid ($H_5IO_6$) in 5 ml. of water was added slowly. After 15 minutes again 0.50 g. of periodic acid in 2 ml. of water was added. The reaction mixture was kept at room temperature for 30 minutes and then treated with a solution of 3.0 g of sodium disulphite in 5 ml. of water. The iodine formed was reduced with sodium thiosulphate. The organic layer was salted out, was separated and the aqueous layer was extracted with methyl isobutyl ketone and the combined organic fractions were concentrated to dryness. The residue was purified and finally crystallized from methanol/water. Yield: 1.0 g. of 3 - methoxy-14α,17α-dihydroxy-1,3,5(10),9(11)-estratetraene-17β-carboxylic acid.

Melting point: 184–188° C.
I.R. (in $CHCl_3$): $\nu_{max}$=3600, 3550, 3375, 1768, 1708, 1618, 1603, 1568 and 1492 cm.$^{-1}$.

(j) A solution of 0.80 g. of 3-methoxy-14α,17α-dihydroxy - 1,3,5(10),9(11) - estratetrane-17β-carboxylic acid in 30 ml. of a mixture (1:1) of methanol and methylene chloride was shaken with 20 mg. of platinum oxide for 3 hours, in a hydrogen atmosphere. The catalyst was removed by filtration and the filtrate was concentrated. The residue was purified by column chromatography (silicagel; eluent solution of 5% acetone in benzene). Yield: 320 mg. of 3-methoxy-14α,17α-dihydroxy-1,3,5(10)-estratriene-17β-carboxylic acid.

Melting point: 162–164° C.
I.R. (in $CHCl_3$): $\nu_{max}$=3610, 3400, 2840, 1769, 1710, 1608, 1570 and 1495 cm.$^{-1}$.

(k) A solution of 2.0 g. of 3-methoxy-14α,17α-dihydroxy-1,3,5(10)-estratriene-17β-carboxylic acid in a mixture of 12 ml. of paraldehyde, 12 ml. of dioxane and 0.1 ml. of 70% perchloric acid was kept at room temperature for 20 minutes. Successively were added 3.0 ml. of aqueous N sodium hydrogen carbonate solution and 60 ml. of water. The precipitate yielded 2.0 g. of 3-methoxy-14α,17α - ethylidenedioxy-1,3,5(10)-estratriene-17β-carboxylic acid.

Melting point 171–174° C.
I.R. (in $CHCl_3$): $\nu_{max}$=3435, 1772, 1710, 1609, 1573, 1498, 1402, 1348 and 1109 cm.$^{-1}$.

(l) A mixture of 2.0 g. of 3-methoxy-14α,17α-ethylidenedioxy-1,3,5(10) - estratriene - 17β - carboxylic acid, 2.8 g. of lead tetra-acetate, 0.23 g. of lithium chloride and 65 ml. of benzene were refluxed in a nitrogen atmosphere for 30 minutes. The cooled mixture was diluted with 150 ml. of methyl isobutyl ketone, washed with water and the solvent evaporated in vacuo. Yield: 0.40 g. of 17β-chloro-3 - methoxy - 14α,17α-ethylidenedioxy - 1,3,5(10)-estratriene, isolated as an oil.

$\lambda_{max}$ (in methanol) =225 (shoulder), 278 and 286 nm.; $E_{1cm}^{1\%}$=165, 45 and 41

I.R. (in $CHCl_3$): $\nu_{max}$=2860, 1609, 1570, 1493, 1400, 1158, 1135, 1100, 1050, 979 and 860 cm.$^{-1}$.
N.M.R. (in $CDCl_3$): δ=1.05, 1.39 (doublet), 3.79, 5.28 (quadruplet) 6.66, 6.70 and 7.25 (AB-spectrum) p.p.m.
Molecular ion peak in mass spectrum:
Calculated for $C_{21}H_{27}O_3Cl$: 362/364. Found: 362/364.

EXAMPLE V (a) According to the procedure described in Example IVk, 3-methoxy-14α,17α-dihydroxy-1,3,5(10)-estratriene-17β-carboxylic acid (prepared according to the procedure described in Example IVa–j) was converted with hexanal to 3-methoxy-14α,17α-hexylidenedioxy - 1,3,5(10) - estratriene-17β-carboxylic acid.

Melting point: 135–136° C.
I.R. (in $CHCl_3$): $\nu_{max}$=3435, 1770, 1710, 1609, 1573, 1498, 1350 and 1109 cm.$^{-1}$.

(b) According to the procedure described in Example IVl, 3 - methoxy-14α,17α-hexylidenedioxy-1,3,5(10)-estratriene-17β-carboxylic acid was converted to 17β-chloro-3-methoxy-14α,17α-hexylidenedioxy-1,3,5(10) - estratriene, isolated in oil.

$\lambda_{max}$ in methanol=225 (shoulder), 279 and 287 nm.; $E_{1cm}^{1\%}$=145, 36 and 34

I.R. (in $CHCl_3$): $\nu_{max}$=2858, 1608, 1572, 1495, 1155, 1100, 1035, 1015, 900 and 860 cm.$^{-1}$.
N.M.R. (in $CDCl_3$): δ=0.97 (triplet), 1.14, 3.78, 5.08 (triplet), 6.67, 6.7 and 7.3 (AB-spectrum) p.p.m.
Molecular ion peak in mass spectrum:
Calculated for $C_{25}H_{35}O_3Cl$: 418/420. Found: 418/420.

EXAMPLE VI (a) According to the procedure described in Example IVk, 3 - methoxy-14α,17α-dihydroxy-1,3,5(10) - estratriene-17β-carboxylic acid (prepared according to the procedure described in Example IVa–j) was converted with benzaldehyde to 3-methoxy - 14α,17α - benzylidenedioxy-1,3,5(10)-estratriene-17β-carboxylic acid.

Melting point: 195–200° C.
I.R. (in $CHCl_3$): $\nu_{max}$=3445, 1770, 1710, 1610, 1573, 1495, 1350 and 1095 cm.$^{-1}$.

(b) According to the procedure described in Example IVl, 3 - methoxy - 14α,17α-benzylidenedioxy-1,3,5(10)-estratriene - 17β - carboxylic acid was converted to 17β-chloro-3-methoxy-14α,17α - benzylidenedioxy - 1,3,5(10)-estratriene. Melting point: 135–138° C.

$\lambda_{max}$ (in methanol) =226 (shoulder), 279 and 286 nm.; $E_{1cm}^{1\%}$=136, 41 and 38

I.R. (in $CHCl_3$): $\nu_{max}$=1609, 1570, 1492, 1380, 1152, 1090, 1048, 990, 870 and 858 cm.$^{-1}$.
N.M.R. (in $CDCl_3$): δ=1.11, 3.79, 6.06, 6.68, 6.75 and 7.25 (AB-spectrum) and 7.3–7.7 (multiplet) p.p.m.
Molecular ion peak in mass spectrum: Calculated for $C_{26}H_{29}O_3Cl$: 24/426. Found: 424/426.

EXAMPLE VII

To a stirred suspension of 4.4 g. of lead tetra-acetate in 75 ml. of refluxing carbon tetrachloride were added 3.7 g. of 3 - methoxy - 14α,17α - ethylidenedioxy - 1,3,5(10)-estratriene - 17β - carboxylic acid (prepared according to the procedure described in Example IVa–k) and then 1.27 g. of iodine. The reaction mixture was illuminated with a tungsten lamp for 2 hours. The cooled reaction mixture was filtered and the filtrate washed with N perchloric acid and water. On evaporation of the solvent there is obtained 0.9 g. of 17β-iode-3-methoxy-14α-17α-ethylidenedioxy-1,3,5(10)-estratriene, isolated as an oil.

$\lambda_{max}$ (in methanol)=225 (shoulder), 277 and 286 nm.; $E_{1cm}^{1\%}$=225, 50 and 42

I.R. (in $CHCl_3$): $\nu_{max}$=2858, 1608, 1570, 1492, 1400, 1159, 1134, 1094, 1047, 979, 942, 915 and 859 cm.$^{-1}$.
N.M.R. (in $CDCl_3$): δ=0.98, 1.35 (doublet), 3.78, 5.28 (quadruplet), 6.67, 6.75 and 7.3 (AB-spectrum) p.p.m.
Highest peak in mass spectrum:
Calculated for $C_{21}H_{27}O_3I$: 454. Found: 308 [mol-weight-(mol.weight HI+$H_2O$)]

EXAMPLE VIII

According to the procedure described in Example VII, 3 - methoxy - 14α,17α - hexylidenedioxy - 1,3,5(10)-estratriene - 17β - carboxylic acid (prepared according to the procedure described in Example Va) was converted to 17β - iodo - 3 - methoxy - 14α,17α - hexylidenedioxy-1,3,5(10)-estratriene, isolated as an oil.

λ$_{max}$ (in methanol) = 225 (shoulder), 278 and 286 nm.; $E_{1cm}^{1\%}$ = 165, 38 and 33

I.R. (in CHCl$_3$): ν$_{max}$ = 2845 (shoulder), 1608, 1570, 1490, 1380, 1152, 1104, 1030, 950 and 852 cm.$^{-1}$.

N.M.R. (in CDCl$_3$): δ = 0.88 (triplet), 1.00, 3.80, 5.10 (triplet), 6.68, 6.75 and 7.3 (AB-spectrum) p.p.m. Highest peak in mass spectrum:
Calculated for C$_{25}$H$_{35}$O$_3$I: 510. Found: 364 [mol. weight-(mol. weight HI+H$_2$O.)]

The invention includes within its scope pharmaceutical preparations containing, as the active ingredient, at least one of the thereapeutically active compounds of Formula 1 in association with the pharmaceutically acceptable carrier. The preparations may take any of the forms customarily employed for administration of therapeutically active substances, but the preferred types are those suitable for oral administration, especially tablets, including sustained release tablets, pills and capsules including the substance and those suitable for parenteral administration. The tablets and pills may be formulated in the usual manner with one or more pharmaceutically acceptable diluents or excipients, and include materials of lubricating nature. Capsules made of absorbable material, such as gelatin, may contain the active substance alone or in a mixture, with a solid or liquid diluent. Liquid preparations may be in the form of suspensions, emulsions, syrups or elixirs of the active substance in water or other liquid medium commonly used for mixing orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

For parenteral administration to adult humans the daily dosage may range from 0.1 to 1.0 g.; a suitable concentration of the active principle in the injectable preparation is 100 mg./ml. A pharmaceutical preparation which can be used for human therapy according to the invention is described in the following.

Example 10 g. of 17β - chloro - 3 - methoxy - 14α,17α-hexylidenedioxy-1,3,5(10)-estratriene (prepared according to the procedure described in Example V) were dissolved in 100 ml. of purified corn oil containing 10% of benzyl alcohol (pharmaceutical grade). The solution was filtered through a sterilizing filter. Sterile ampoules of 1 ml. were filled under aseptic conditions with 1 ml. of the solution thus obtained.

What we claim and desire to secure by letters patent is:
1. 14α,17α - methylenedioxy - estrane derivative of the formula

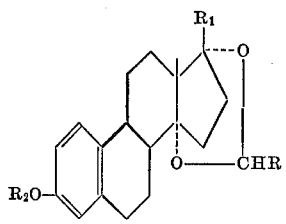

wherein R represents an aliphatic hydrocadbon group having less than 6 carbon atoms or a phenyl group, R$_1$ represents an acetoxy group or a halogen atom and R$_2$ represents an alkyl group having less than 5 carbon atoms.

2. 14α,17α - methylenedioxy - estrane derivative according to claim 1, wherein R$_1$ represents an acetoxy group and R$_2$ represents a tert. butyl group.

3. 14α,17α - methylenedioxy - estrane derivative according to claim 1 wherein said derivative is 3-tert.butyloxy-14α,17α - ethylidenedioxy - 17β - acetoxy - 1,3,5(10)-estratriene.

4. 14α,17α - methylenedioxy - estrane derivative according to claim 1 wherein said derivative is 3-tert.butyloxy-14α,17α - hexylidenedioxy - 17β - acetoxy - 1,3,5(10)-estratriene.

5. 14α,17α - methylenedioxy - estrane dirivative according to claim 1 wherein said derivative is 3-tert.butyloxy-14α,17α - benzylidenedioxy - 17β - acetoxy - 1,3,5(10)-estratriene.

6. 14α,17α - methylenedioxy - estrane derivative according to claim 1 wherein said derivative is 17β - chloro - 3-methoxy-14α,17α-ethylidenedioxy-1,3,5(10)-estratriene.

7. 14α,17α - methylenedioxy - estrane derivative according to claim 1 wherein said derivative is 17β-chloro-3-methoxy - 14α,17α - hexylidenedioxy - 1,3,5(10)-estratriene.

8. 14α,17α - methylenedioxy - estrane derivative according to claim 1 wherein said derivative is 17β-chloro-3-methoxy - 14α,17α - benzylidenedioxy-1,3,5,(10)-estratriene.

9. 14α,17α - methylenedioxy - estrane derivative according to claim 1 wherein said derivative is 17β - iodo - 3-methoxy - 14α,17α - ethylidenedioxy - 1,3,5(10)-estratriene.

10. 14α,17α - methylenedioxy-estrane derivative according to claim 1 wherein said derivative is 17β - iodo-3-methoxy - 14α,17α - hexylidenedioxy - 1,3,5,(10)-estratriene.

11. A 14α,17α - methylenedioxy - estrane derivative of the formula

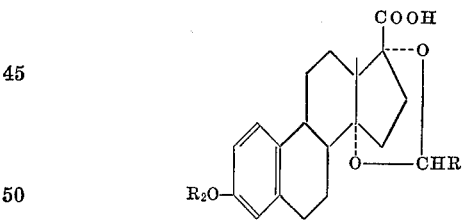

wherein R represents an aliphatic hydrocarbon group having less than 6 carbon atoms or a phenyl group and R$_2$ represents an alkyl group having less than 5 carbon atoms.

References Cited

FOREIGN PATENTS 6703781    9/1968    Netherlands

ELBERT L. ROBERTS, Primary Examiner
E. G. LOVE, Assistant Examiner

U.S. Cl. X.R.

195—51; 260—397.1; 397.4, 397.45; 424—241